United States Patent [19]

Insetta et al.

[11] Patent Number: 5,018,047
[45] Date of Patent: May 21, 1991

[54] ADJUSTABLE MULTILAYER CAPACITOR

[75] Inventors: Victor Insetta; Richard V. Monsorno, both of Jacksonville, Fla.; Donald J. Davis, Jr., Rocky Point; Stephen Beyel, Brentwood, both of N.Y.

[73] Assignee: American Technical Ceramics Corporation, Huntington Station, N.Y.

[21] Appl. No.: 556,323

[22] Filed: Jul. 20, 1990

[51] Int. Cl.$^5$ .......................... H01G 5/24; H01G 4/34
[52] U.S. Cl. .................................. 361/277; 361/321; 361/330
[58] Field of Search ..................... 361/321, 328–330, 361/277; 29/25.42

[56] References Cited

U.S. PATENT DOCUMENTS

| | | | |
|---|---|---|---|
| 4,074,340 | 2/1978 | Leigh | 361/321 |
| 4,466,045 | 8/1984 | Coleman | 361/277 |
| 4,856,102 | 8/1989 | Insetta et al. | 361/330 |

Primary Examiner—Donald A. Griffin
Attorney, Agent, or Firm—John P. White

[57] ABSTRACT

A multilayer capacitor has a dielectric block with a marked position where the adjustable capacitance is to be placed. The capacitor has two end walls on which are first and second terminal electrodes. The electrodes have first and second narrow bands extending over marginal end portions of first and second side walls of the block. Two narrow spaced conductive stripes on the first side wall extend from the first band along lateral edges of the first side wall and terminate short of the second band to define a first rectangular U-shaped extension of the first terminal electrode on the first side wall. In the block are embedded spaced electrodes to determined the capacitance of the capacitor. A first stripe of conductive ink of any desired width can be applied to an uncovered area of the first wall to contact the U-shaped extension of the first terminal electrode to adjust capacitance of the capacitor. Two other conductive stripes applied to the second side wall to extend from the second band and terminate short of the first band to define a second U-shaped extension of the second terminal electrode. A second stripe of conductive ink can be applied to an uncovered area of the second wall to contact the second U-shaped electrode extension to further adjust the capacitance of the capacitor.

9 Claims, 2 Drawing Sheets

ADJUSTABLE MULTILAYER CAPACITOR

BACKGROUND OF THE INVENTION

1. Field of the Invention

This invention relates to the art of miniature multilayer capacitors, and more particularly concerns capacitors having means for adjusting the capacitances in a greater range of capacitance values than has heretofore been possible.

2. Description of the Prior Art

It has herefore been proposed to provide a miniature capacitor with a plurality of external electrode stripes which can be connected by conductive jumpers to each other and to terminal electrodes for selectively adjusting the capacitance value of the capacitor. Such a construction is described in U.S. Pat. No. 4,865,102, dated Aug. 8, 1989. This prior means for capacitance adjustment has proven to have several disadvantages. In the first place, the capacitor is provided with a descrete number of external electrodes which sets a finite limit on the number of capacitance adjustments which can be made. Another objection is difficulty of soldering the jumpers to the electrodes. This process requires precision soldering equipment and skilled operators because jumpers may be 0.010 or less in length.

SUMMARY OF THE INVENTION

It is a therefore a principal object of the present invention to avoid the above and other difficulties and disadvantages of the prior methods and means for adjusting capacitance values of miniature capacitors by providing a relatively simple means for very accurately adding capacitance to a capacitor. According to the present invention, a monolithic multilayer capacitor is provided with means for indicating a position on the capacitor where an electrode may be formed to add capacitance to the capacitance value of the existing capacitor. These means on the capacitor may be comprised of a pair of laterally spaced electrode terminations on one or two sides, which terminations are narrow conductive stripes which are extensions of and in direct electric circuit with one terminal electrode on each side of the capacitor. These electrode terminations add negligible amounts of capacitance to the capacitor. According to the invention, the pair of electrode extensions on each side can be bridged or joined by a stripe of electrically conductive ink preferably applied by a suitable dispensing pen to serve as a capacitor electrode. The stripe can be of any desired width, depending on the capacitance value to be added to the capacitor. The ink electrode cooperates with the internal electrodes in the capacitor. The capacitor can be monitored by instruments while the conductive ink is being applied to insure that precisely the amount of capacitance adjustment desired has been effected. Excess ink can be removed while it is still wet and/or additional ink can be applied to widen a stripe as may be necessary. Thus the invention makes possible an infinite number of capacitance adjustments, as contrasted with prior capacitance adjustment means where only one or a limited number of capacitance adjustments can be made. The invention avoids the use of prior electrode jumpers.

These and other objects and many of the attendant advantages of this invention will be readily appreciated as the same becomes better understood by reference to the following detailed description when considered in connection with the accompanying drawings in which:

Figure 1:
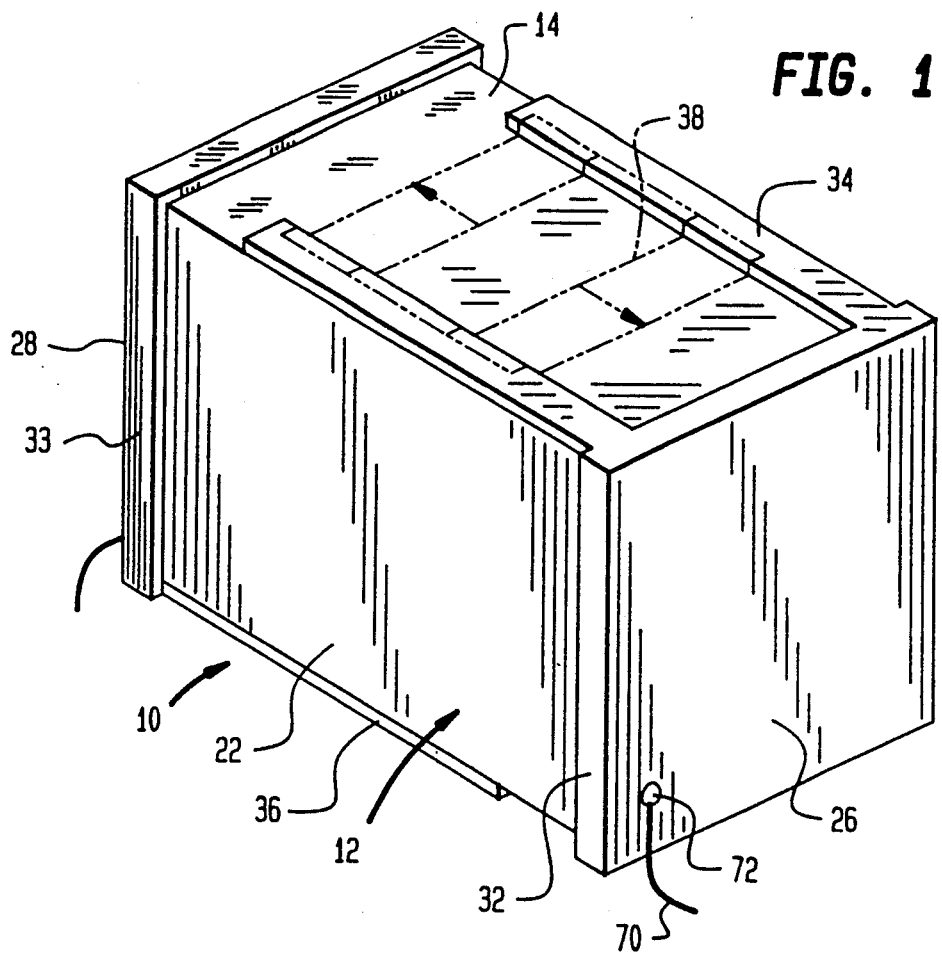
FIG. 1 is a greatly magnified perspective view of a miniature capacitor embodying the invention.
Figure 2:
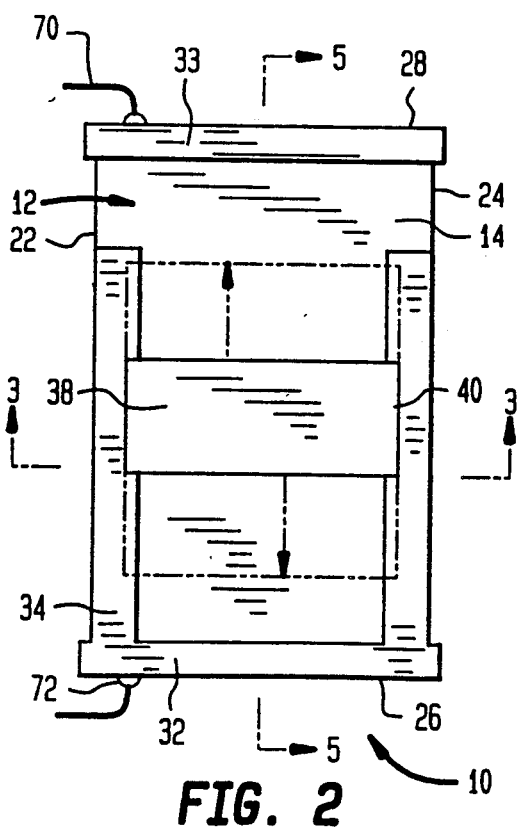
FIG. 2 is a top plan view of the capacitor.
Figure 3:
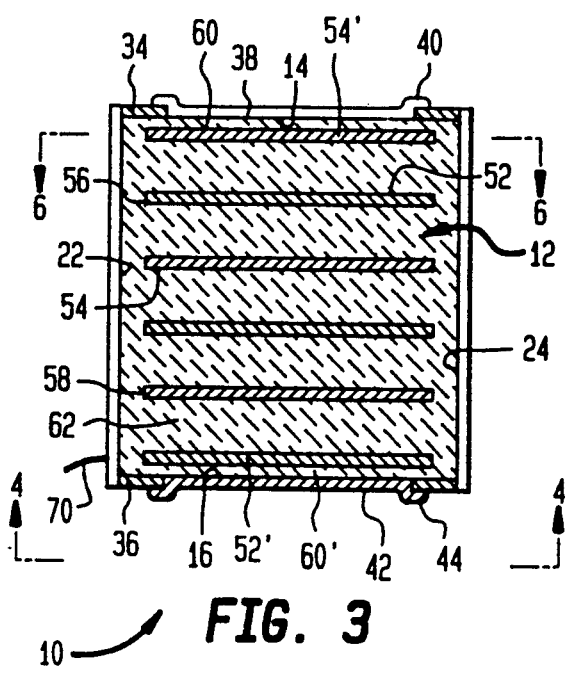
FIG. 3 is a section view taken along line 3—3 of FIG. 2.
Figure 5:
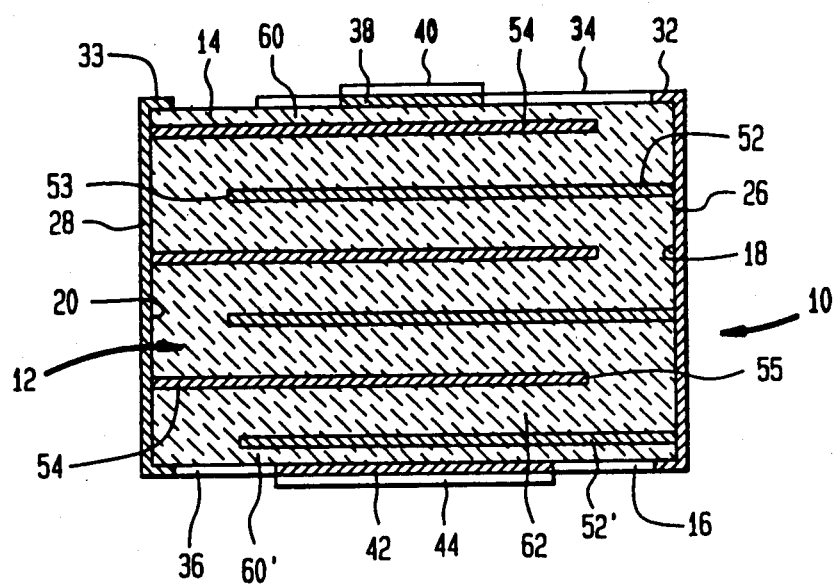
FIG. 5 is a central longitudinal sectional view taken along line 5—5 of FIG. 2.
Figure 4:
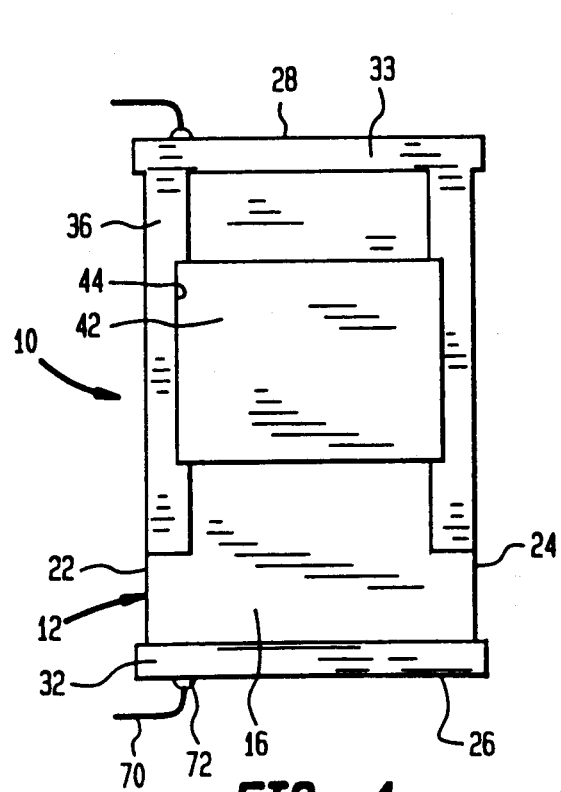
FIG. 4 is a bottom plan view taken along line 4—4 of FIG. 3.
Figure 6:
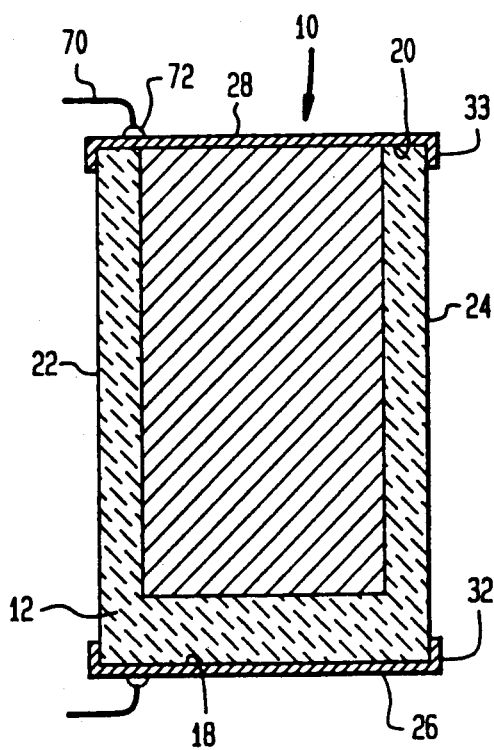
FIG. 6 is a horizontal sectional view taken along line 6—6 of FIG. 3.

Referring now to the drawings wherein like reference characters designate like or corresponding parts throughout, there is illustrated in FIGS. 1-6 a multiple layered monolithic capacitor generally designated by reference number 10. The capacitor 10 has a solid rectangular body in the form of a block 12 made of fired ceramic material as well known in the art. The block 12 has opposed flat upper and lower sides or walls 14, 16, flat opposed end walls 18, 20 and flat opposed side walls 22, 24. The end walls 18, 20 are coated and covered with thin electrically conductive metal or metalized layers 26, 28 which serve as terminal electrodes of the capacitor 10. The layers 26, 28 continue around corners of the block to form stripes or bands 32, 33 at all four walls or sides 14, 16, 22, 24. The band 32 has a pair of laterally narrow extensions 34 at outer edges of and on the top wall 14. The extensions 34 are stripes of electrically conductive material which are in direct electric circuit with the terminal electrode 26 via the band 32. On the bottom wall 16 are two laterally spaced narrow stripes 36 which are extensions of the band 33. The stripes 36 are parallel to each other and are in direct electric circuit with the terminal electrodes 28. The stripes 34 terminate short of and are spaced from the band 33 so they are insulated from the band 33. The stripes 36 are located along lateral edges of the bottom wall 16. The stripes 36 terminate short of and are spaced from the band 32 so they are insulated therefrom.

The stripes 34 are in direct electric circuit with the terminal electrode 26 via the band 32 to constitute a rectangular U-shaped extension of the terminal electrode 26 on the wall 14. The two laterally spaced stripes 36 on the wall 16 are extensions of the band 33. They are parallel to each other and are in direct electric circuit with the terminal electrode 28 to constitute a rectangular U-shaped extension of the electrode 28. Between the stripes 34 and 36 are wide uncovered areas of walls 14 and 16 adjacent to the internal electrodes 54' and 52'.

The space between the stripes 34 can be partially filled to any desired extent by drawing a stripe 38 of electrically conductive ink on the wall 14 overlapping one or both of the stripes 34 at opposite ends 40 to make positive physical and electrical contact therewith. The stripe 38 can if desired extend up to and overlap the band 32. The space between the stripes 36 can also be filled to any desired extent by drawing a stripe 42 of electrically conductive ink on the wall 16 overlapping one or both of the stripes 36 at opposite ends 44 to make positive physical and electrical contact therewith. The stripe 42 can if desired extend up to and overlap the band 33. A suitable conductive ink for the present purpose may be a conductive silver bearing theremoplastic acrylic polymer such as manufactured by Planned Products Company of Santa Cruz, Calif., and assigned the type number "Conductor 2200". This material can be applied by a brush, but is especially adapted for application by a manually held pen. Application of the conductive ink by pen is preferred because fine lines or the stripes 38, 42 can be inscribed on the walls 14, 16 of the capacitor 10 to form electrodes which will increase the capacitance of the capacitor 10 to any desired extent.

The block 12 is formed of dielectric material which may be of sintered ceramic. Embedded in the block 12 are two sets of thin laterally spaced parallel conductive plates 52, 54; see FIGS. 3, 6. The plates 52 extend up to and are direct electrical contact with electrically conductive terminal layer 26. Opposite ends 53 of the plates 52 terminate short of and are spaced from the terminal layer 28. The plates 54 which alternate with the plates 52 extend up to and are in direct electrical contact with the electrically conductive terminal layer 28. Lateral edges 56, 58 of the rectangular plates 52, 54 are spaced slightly from the side walls 22, 24. The top and bottom plates 54' and 52' are very closely spaced from the side stripes 34, 36 and the ink stripes 38, 42 being separated by respective very thin dielectric spacers 60, 60'. The thickness of the spacers 60, 60' is about one-tenth the thickness of a block section or slab 62 which separates the other plates 52, 54. The narrow spacing between the plate 54' and the stripes 38, and the plate 52' and the stripe 42, is an important feature of the invention. The plates 52, 52' and 54, 54' constitute electrodes which determine the basic minimum capacitance of the fixed capacitor 10.

When, according to the invention, the capacitance of the fixed capacitor 10 is to be modified or adjusted, one or both pairs of conductive edge stripes 34, 36 are mechanically and electrically connected by applying conductive ink stripes or lines 38, 42 of any desired width terminating at extensions 34, 36 of terminal electrodes 26, 32 and 28, 33.

If desired the conductive edge stripes 34, 36 may be eliminated and one or more markers or indicators i.e. an arrow or a dot, may be placed on the capacitor to indicate the termination layer to which the conductive ink stripe or stripes are to be connected. That is, in the foregoing illustrated capacitor the stripes must be connected to only the band 32 on the wall 14 and or only to the band 28 on the wall 16.

In one example of a practical capacitor, the thickness of the ceramics spacers 60, 60' may be 0.001 inches, whereas the thickness of the spacer slabs 62 may be 0.010 inches or ten times the thickness of the spacers 60, 60'. The total width of the block 12 taken transversely between the side walls 22, 24 may be 0.060. The total length of the block 12 between the end walls 18, 20 may be 0.080 inches and the block thickness between top and bottom walls 14, 16 may be 0.040 inches. The basic unadjusted capacitance of the capacitor 10 may be about 10 pf. The capacitor 10 is a miniature component well adapted for insertion into microcircuits. The selective addition of more or less conductive ink to stripes 38, 42 makes it possible to make very small precise adjustments to the capacitance of the capacitor. Such adjustments can be much finer than is possible by the addition of the prior jumpers to preformed external electrodes. Adjustments are possible from a fraction of 1% to more than 10%. An infinite number of capacitance adjustments can be made depending on the specification requirements, without limit to a finite number as in prior capacitor adjustment means.

If desired it is possible to solder circuit wires to the ink stripes 38, 42. Lead wires 70 can also be connected to the terminal electrodes 26, 28 by solder joints 72.

It should be understood that the foregoing relates to only a limited number of preferred embodiments of the invention which have been by way of example only, and that is intended to cover all changes and modifications of the examples of the invention herein chosed for the purposes of the disclosure, which do not constitute departures from the spirit and scope of the invention.

What is claimed is:

1. A capacitor having an adjustable capacitance, comprising:
    a miniature monolithic dielectric block having rectangular end walls and four side walls each perpendicular to and terminating at said end walls;
    a first conductive terminal layer on one of said end walls extending over a marginal portion of at least one of said side walls;
    a second conductive terminal layer on said other end wall extending over a marginal portion of at least one of said side walls;
    laterally spaced internal electrodes embedded in said block parallel to said one side wall and alternately terminating at said first and second terminal layers to define said capacitance;
    an external electrode composed of an electrically conductive ink on one of said side walls; and
    marker means on one or more of said side walls to indicate to which of said marginal portions of said conductive terminal layers said external electrode is to be connected, said marker means comprising a pair of spaced conductive strips on said one side wall extending from said first terminal layer along said one side wall and terminating short of the other one of said end walls to define a rectangular external U-shaped terminal electrode on said one side wall leaving an uncovered area of said one side wall bounded by said U-shaped terminal electrode;
    whereby said external electrode can be drawn across said uncovered area of said one of said side walls and connected to said U-shaped terminal electrode to increase the capacitance of said capacitor.

2. A capacitor having an adjustable capacitance, comprising:
    a miniature monolithic dielectric block having rectangular end walls and a plurality of side walls perpendicular to and terminating at said end walls;
    a first conductive terminal layer on one of said end walls extending over a marginal portion of one of said side walls;
    a pair of narrow conductive stripes on said one side wall extending from side marginal portion of said first terminal layer along lateral edges of said one side wall and terminating short of the other one of said end walls to define a rectangular external U-shaped terminal electrode on said one side wall leaving a wide uncovered area of said one side wall bounded by said U-shaped terminal electrode;
    a second conductive terminal layer on said other end wall;
    laterally spaced internal electrodes embedded in said block parallel to said one side wall and alternately terminating at said first and second terminal layers to define said capacitance; and a stripe of conductive ink drawn across said uncovered area of said one side wall to contact said other U-shaped terminal electrode for further adjusting said capacitance.

3. A capacitor as claimed in claim 2, wherein said second conductive terminal layer extends over a marginal portion of on another of said side walls opposite from and parallel to said one side wall, and further comprising:

another pair of narrow conductive stripes on said other side wall extending from said marginal portion of said second conductive terminal layers and terminating short of said first conductive terminal layer to define another rectangular U-shaped terminal electrode on said other side wall, leaving another wide uncovered area of said one side wall bounded by said U-shaped terminal electrode; and another stripe of conductive ink drawn across said uncovered area of said other side wall to contact said other U-shaped terminal electrode for further adjusting said capacitance.

4. A capacitor as claimed in claim 3, wherein said first named and said other stripes of conductive ink can be drawn across said first named and said other side walls in different selective widths for effecting an infinite number of adjustments of said capacitance.

5. A capacitor having an adjustable capacitance, comprising:

a miniature monolithic dielectric block having a plurality of external walls;

two spaced conductive terminal layers on two of said walls respectively;

laterally spaced electrodes embedded in said block in direct electric circuit with different ones of said terminal layers to determine said capacitance;

a pair of first narrow conductive stripes spaced apart from each other on a third one of said walls and connected in direct electric circuit with one of said terminal layers to constitute extensions thereof spaced from said electrodes in said block, said stripes extending along lateral edges of said third wall; and another electrically conductive stripe applied to said third wall and extending across said wall to make direct physical and electrical contract with at both of said first conductive stripes, so that said other stripe constitutes an external electrode on said block for adjusting said capacitance.

6. A capacitor as claimed in claim 5, wherein said one terminal layer has a portion extending over a marginal portion of said third wall and integrally joined to adjacent ends of said first conductive stripes, said first conductive stripes having other ends spaced from one another of said terminal layers to insulate said external electrode therefrom.

7. A capacitor as claimed in claim 5, further comprising:

a pair of second conductive stripes spaced apart from each other on a fourth one of said walls and connected in direct electric circuit with one of said other one of said terminal layers, said second stripes being disposed adjacent to and spaced from said electrodes in said block; and a further electrically conductive stripe applied to said fourth wall to make direct physical and electrical contact at with both of said second conductive stripes, so that said further stripe constitutes another external electrode on said block for adjusting said capacitance.

8. A capacitor as claimed in claim 7, wherein said other and said further stripes are appliable in any desired widths on said third and fourth walls, so that an infinite number of adjustments of said capacitance are made possible.

9. A capacitor as claimed in claim 5, wherein said one terminal layer has a portion extending over a marginal portion of said fourth wall and integrally joined to adjacent ends of said first conductive stripes, said first conductive stripes having other ends spaced from said first mentioned one terminal layer to insulate said external electrode therefrom.

* * * * *